Patented June 12, 1928.

1,672,920

UNITED STATES PATENT OFFICE.

BYRON L. WEST, OF HAMBURG, NEW YORK, ASSIGNOR TO NATIONAL ANILINE & CHEMICAL CO. INC., OF NEW YORK, N. Y., A CORPORATION OF NEW YORK.

PRODUCTION OF DYESTUFF POWDERS.

No Drawing. Application filed April 2, 1926. Serial No. 99,402.

This invention relates to the manufacture and production of dyestuffs and other substances in the form of powders.

In the reduction of the tinctorial value of dyestuffs for commercial purposes it is well known that they are commonly reduced, i. e., diluted or "cut," by incorporating with them certain suitable extraneous substances. The substances commonly employed are those ordinarily used in the dye-bath, chiefly salts, and more especially inorganic salts such as, for example, sodium chloride, sodium carbonate, sodium sulfate, etc., and which appear white in color when pulverized or powdered.

In the preparation of a diluted or "cut" dyestuff in the form of a powder, it is well known practice to grind the dry dyestuff in admixture with the diluent or "cutting" material and subject the powder thus obtained to a more thorough mixing, for example, in a "mixer" such as a stirring apparatus or a rotating drum, etc. Ordinarily, the admixture of dyestuff and diluent is passed only once or twice through a speed mill or grinding apparatus where it is not subjected to a long and continued regrinding process.

The reduced, diluted or "cut" powders thus produced seldom, if ever, have the same shade or color in their physical appearance as the powdered concentrated (that is, "uncut") dyestuff itself or of a solution of the dyestuff. Further, they usually lack the appearance of homogeneity or uniformity since the diluent or "cutting" material has not itself become substantially colored by the dyestuff.

The object of the present invention is the preparation of a reduced or "cut" dyestuff as a powder which presents a substantially uniform and homogeneous physical appearance as to color and other physical characteristics such as, for example, lustre.

It has been found that by triturating, i. e., by impact, rubbing, pounding, etc., a dyestuff in admixture with a salt which contains water of crystallization, and in the presence or absence of a diluent or other "cutting" material such as common salt, etc., that a resulting product can be obtained which is substantially uniform in its physical appearance, particularly as regards color or and, generally, as regards lustre. It has been further found that the color and the lustre of the final product depends on the relative amounts of dyestuff, "cutting" material, hydrated salt (that is, a salt which contains water of crystallization), and the hygroscopic or absorbed moisture which is present, and also on the severity or force and length of time it is subjected to trituration. By properly arranging these factors a reduced or "cut" dyestuff in powdered form can be obtained which varies in color from that of the dyestuff in solution to that of the concentrated, i. e., "uncut," dyestuff itself in powdered form. The lustre produced also depends on these factors, particularly on the severity or force and length of time of trituration.

In carrying out the present invention, the dry dyestuff is preferably ground in admixture with the hydrated salt and such other "cutting" material as may be desired, and, the powder thus obtained, with or without further mixing in a "mixer," is triturated, for instance, in a mortar and pestle apparatus, or in a rotary ball mill or tumbler, until there is produced a powder having a substantially uniform physical appearance and of a desired color or lustre. The invention is preferably carried out at ordinary temperatures but other temperatures may be employed, particularly below the melting point of the hydrated salt. The trituration may be carried out, however, in any other suitable manner, as by long continued regrinding, etc.

The invention will be further illustrated by the following specific examples, but it will be understood that it is not limited thereto. The parts are by weight.

*Example 1.*—45 parts of Erie Black GXOO dried press-cake containing about 9 to 10 per cent moisture, 50 parts common salt containing about 3 to 4 per cent moisture, 4 parts dry sodium carbonate and 17.5 parts of Glauber's salt crystals are ground together to a powder and the powder further thoroughly mixed by stirring. The powder, which is gray in color, is then placed in a tumbler ball mill and triturated until it is uniform in physical appearance as a dark powder with a bronze-like lustre.

*Example 2.*—45 parts anhydrous sodium sulfate, 15 parts crystallized sodium sulfate and 40 parts of Niagara Blue 2B dried press-cake containing about 8 per cent moisture are ground in admixture to a powder and the powder thus obtained then placed in a ball mill and triturated. After a short time, the mass assumes a light blue color which gradually becomes darker as the trituration proceeds and finally a uniform dark blue powder is obtained. If the trituration continues longer, the product begins to take on a "sheen" or lustre until finally a bronzy blue-black powder is produced. The trituration is stopped when the desired shade or lustre has been obtained.

*Example 3.*—50 parts Sulfur Black dried press-cake containing about 5 per cent moisture, 40 parts common salt and 10 parts of hydrated sodium sulfide crystals are ground and mixed to a fine powder and then triturated until the mixture is a jet black powder of uniform physical appearance. In this case, the initial Sulfur Black may be substantially insoluble in water but soluble in sodium sulfide solutions. Consequently, hydrated sodium sulfide is employed in preference to other hydrated salts. If desired, reducing agents such as common salt, sodium carbonate, etc., may be present. Other sulfur dyes may be reduced to uniform colored powders in a similar manner.

As a general rule, during the period of trituration, the physical appearance of the admixture gradually assumes a uniform pale or light color which gradually changes to a darker and usually bright powder; then by further trituration the lustre begins to change,—first appearing redder and duller and then finally assuming a coppery or bronze-like appearance. The dry dyestuff employed as initial material in the present invention should preferably contain its normal amount of hygroscopic moisture. This amount is usually different for different dyestuffs and, in general, ranges from about 2 to 15 per cent.

Without limiting the invention to any particular theory, it is suggested that during the trituration a portion of the hydrated salt is probably momentarily liquified at the point of impact and dissolves a small amount of dyestuff which not only colors or stains the hydrated salt but also by distribution or entrainment colors or stains such other "cutting" materials as may be present, the result being that the whole admixture gradually assumes a uniform color. While the invention is not limited to any particular class or color of hydrated salts, those which are white in color and which have a melting point of about 30° to 100° C., and more particularly about 30° to 50° C., are preferred.

I claim:

1. In the production of a powdered dyestuff, a process which comprises triturating a dry dyestuff in admixture with a hydrated salt until the mixture becomes substantially homogeneous in color.

2. In the production of a powdered dyestuff, a process which comprises admixing a dyestuff with a dry diluent and a hydrated salt which is soluble in water and subsequently triturating the admixture until it becomes substantially uniform in color.

3. In the production of a powdered dyestuff, a process which comprises triturating a dry dyestuff in admixture with a hydrated salt which has a melting point of about 30°–100° C. until the mixture becomes substantially uniform in color.

4. In the production of a powdered dyestuff, a process which comprises triturating a dry dyestuff in admixture with a hydrated inorganic salt which is soluble in water, and which has a melting point of about 30°–50° C until the mixture becomes substantially uniform in color and in lustre.

5. In the production of a powdered dyestuff, a process which comprises triturating a dyestuff in admixture with hydrated sodium sulfate until the mixture becomes substantially uniform in color.

6. In the production of a powdered dyestuff, a process which comprises grinding a dyestuff in admixture with hydrated sodium sulfate and common salt and subsequently triturating the ground admixture until the mass becomes substantially uniform in color.

7. In the production of a dye composition, a process which comprises triturating a dyestuff containing a normal amount of hygroscopic moisture in admixture with a hydrated salt which is soluble in water until the mixture becomes substantially uniform in color.

8. In the production of a powdered dyestuff, a process which comprises triturating Niagara blue in admixture with hydrated sodium sulfate until the mixture becomes substantially uniform in color.

In testimony whereof I affix my signature.

BYRON L. WEST.